United States Patent [19]

Liucci

[11] Patent Number: 5,237,957
[45] Date of Patent: Aug. 24, 1993

[54] PRESSURE INDICATOR

[76] Inventor: Charles A. Liucci, 5 Burns Pla., Cresskill, N.J. 07626

[21] Appl. No.: 910,676

[22] Filed: Jul. 8, 1992

[51] Int. Cl.⁵ .......................................... G01L 19/08
[52] U.S. Cl. ..................................... 116/267; 116/272
[58] Field of Search ................. 116/70, 266, 267, 268, 116/272, DIG. 25, DIG. 42

[56] References Cited

U.S. PATENT DOCUMENTS

| 2,669,707 | 2/1954 | Ehrman | 116/267 X |
|---|---|---|---|
| 2,850,900 | 9/1958 | Billington | 116/266 X |
| 2,942,572 | 6/1960 | Pall | 116/267 |
| 2,948,151 | 8/1960 | Astl | 116/267 X |
| 3,077,176 | 2/1963 | Pall et al. | 116/267 |
| 3,077,854 | 2/1963 | Pall | 116/267 |
| 3,187,711 | 6/1965 | Campolong | 116/267 |
| 3,212,471 | 10/1965 | Willis | 116/267 |
| 3,364,897 | 1/1968 | Mouwen | 116/DIG. 42 |
| 3,412,706 | 11/1968 | Topol et al. | 116/267 |
| 3,413,951 | 12/1968 | Keil et al. | 116/267 |
| 3,442,248 | 5/1969 | Parkinson et al. | 116/267 |
| 3,499,415 | 3/1970 | Gutkowski | 116/267 |
| 3,568,625 | 3/1971 | Cilento | 116/267 |
| 3,779,080 | 12/1973 | Smith | 116/272 X |
| 4,029,042 | 6/1977 | Juhasz | 116/267 |
| 4,729,339 | 3/1988 | Whiting | 116/268 |

Primary Examiner—William A. Cuchlinski, Jr.
Assistant Examiner—John L. Beres
Attorney, Agent, or Firm—Kilpatrick & Cody

[57] ABSTRACT

An essentially frictionless, reliable pressure indicator capable of withstanding high pressures is disclosed. The invention includes dual opposed springs, a pair of magnetic elements, and a resilient diaphragm abutting one of the magnetic elements. Use of the resilient diaphragm permits precise control of the amount of travel necessary for the magnetic attractive forces to counteract the mechanical spring forces, increasing the accuracy of the overall device. The present structure, with its resilient diaphragm and an associated dampening aperture, is also designed to withstand transient pressures of as much as 2500 psi or more.

15 Claims, 2 Drawing Sheets

PRESSURE INDICATOR

This invention relates to pressure indicators and more particularly to low or differential pressure indicators (or switches) capable not only of accurate actuation but of withstanding high pressure as well.

BACKGROUND OF THE INVENTION

Pressure indicators are useful in various systems where certain fluid flow rates through the systems are necessary or desirable. Low pressure or large differential pressures in such systems may signal filter clogging, valve inactuation, or fluid leakage, for example, which can produce unwanted or unsatisfactory system performance. By reacting when the pressure has changed or decreased to a specified level across part or all of a system, the indicator can signal interested individuals or activate (or deactivate) equipment as appropriate to reduce the potential losses associated with these conditions.

Existing differential pressure indicators typically include either a bellows or a piston assembly. Bellows-type indicators utilize an expandable and contractible bellows, or accordion-like structure, housing a magnetic element. Although at least some of these indicators are capable of actuating with relative reliability, they are expensive and unable to withstand high pressures without significant performance degradation. High friction coefficients and hysteresis bands associated with piston-type indicators, by contrast, cause unreliable actuation of those indicators at low pressures. Piston-type indicators are prone to leakage as well.

U.S. Pat. No. 3,412,706 to Topol, et al., for example, incorporated herein in its entirety by this reference, discloses a bellows-type differential pressure indicator. According to the Topol patent, the bellows is typically made of tin-plated brass whose operation is limited to pressures less than 250 pounds per square inch ("psi"). A single compressed coil spring opposes the attractive forces of two magnets, one housed within the bellows and the other attached to a button or other visual indicator.

U.S. Pat. No. 2,942,572 to Pall, also incorporated herein by reference, discloses a piston-type differential pressure indicator. The device described in FIG. 1 of the Pall patent includes one magnetic element mounted in a tubular piston and biased toward a retaining wall by a compressed coil spring. A similar spring opposes the magnetic attractive forces and urges a second magnetic element away from the retaining wall. Whenever the differential pressure is greater than the force applied by the compressed coil spring, the piston travels away from the retaining wall and thereby decreases the attractive forces of the two magnetic elements. As the magnetic attractive forces are reduced, the force exerted by the other spring propels an indicator from a position within the device to one where it can be seen. The device also includes a bimetallic strip to preclude actuation at low temperatures. As noted above, however, the piston must additionally overcome friction forces before and as it travels from the retaining wall, reducing the reliability of the device at, particularly, low pressures.

SUMMARY OF THE INVENTION

The present invention avoids inadequacies of the bellows- and piston-type indicators by providing an essentially frictionless, reliable indicator (or switch) capable of withstanding high pressures. The invention includes dual opposed springs, a pair of magnetic elements (positioned so as to attract one to the other), and an elastomeric or other resilient diaphragm abutting (the housing of) one of the magnetic elements. Use of the resilient diaphragm as a travel mechanism reduces to near zero the friction force necessarily overcome before movement can occur and permits precise control of the amount of travel required for the magnetic attractive forces to counteract the mechanical spring forces, increasing the accuracy of the overall device. The present structure, with its resilient diaphragm and an associated aperture, is also designed to withstand transient pressures of as much as 2500 psi or more and provide a unit virtually impervious to shock, vibration, acceleration, and wide environmental extremes.

In an embodiment of the invention adapted for use as an indicator of low pressure within a system, a red-colored or other visual display appears whenever system pressure is reduced below a preselected threshold. Consistent with this embodiment, at ambient, sea-level pressure (approximately 14.7 psi), the differential pressure across the device's diaphragm is zero. In this condition the dual springs exert opposite forces greater than the attractive forces of the magnetic elements, forcing the display from within the device to a visible position. As higher pressures appear across the effective area of the diaphragm, it responds by pushing its abutting magnetic element closer to the other element. This response permits the attractive magnetic forces to overcome those of the opposed springs, thereby, in some embodiments, retracting the visual display to a position within the device. Should lower pressures return to the system, the visual display will again reappear. In other embodiments, alternatively, the visual display could remain visible until manually reset. Additionally, embodiments of the present invention can be coupled to electromagnetic or other equipment and serve as switches whose operation is governed by the pressure changes.

The design equation of equilibrium (achieved at approximately 14.7 psi) for an embodiment of a low pressure indicator may be written as follows:

$$F_A = F_{M1} + F_{M2} - F_{TS} - F_{CS}$$

where $$F_A = P_{IN} \times A_{EFF} \qquad F_{TS} = K_{TS} \times D_{TS}$$
$$F_{M1} + F_{M2} = C \times B_g^2 \times A_g \qquad F_{CS} = K_{CS} \times D_{CS}$$

and $P_{IN}$ = input pressure (psi)
$A_{EFF}$ = effective area of diaphragm (square inches)
$C$ = magnetic constant
$B_g^2$ = magnetic flux (gauss)
$A_g$ = magnetic air gap area (square inches)
$K_{TS}$ = trip spring rate (pounds per inch)
$K_{CS}$ = calibration spring rate (pounds per inch)
$D_{TS}$ = trip spring compression (inches)
$D_{CS}$ = calibration spring compression (inches)

In this embodiment the "trip" spring is that contacting the visual display and magnetic element $M_1$, while the "calibration" spring is associated with magnetic element $M_2$. Although both $M_1$ and $M_2$ can be magnets, other combinations of magnetic elements, such as one magnet and an iron or other element, can be used as well.

It is therefore an object of the present invention to provide an essentially frictionless, reliable indicator of pressures, whether absolute, gauge, or differential.

It is an additional object of the present invention to provide an indicator capable of withstanding high pressures without significant degradation of operation or performance.

It is another object of the present invention to provide an indicator including a resilient diaphragm permitting precise control of the amount of travel necessary for the magnetic attractive forces to overcome the mechanical spring forces.

It is yet another object of the present invention to provide an indicator utilizing dual opposed springs and a pair of magnetic elements (positioned so as to attract one to the other), with one of the magnetic elements abutting the diaphragm.

Other objects, features, and advantages of the present invention will become apparent with reference to the remainder of the written portion and the drawings of this application.

DETAILED DESCRIPTION

Figure 1:
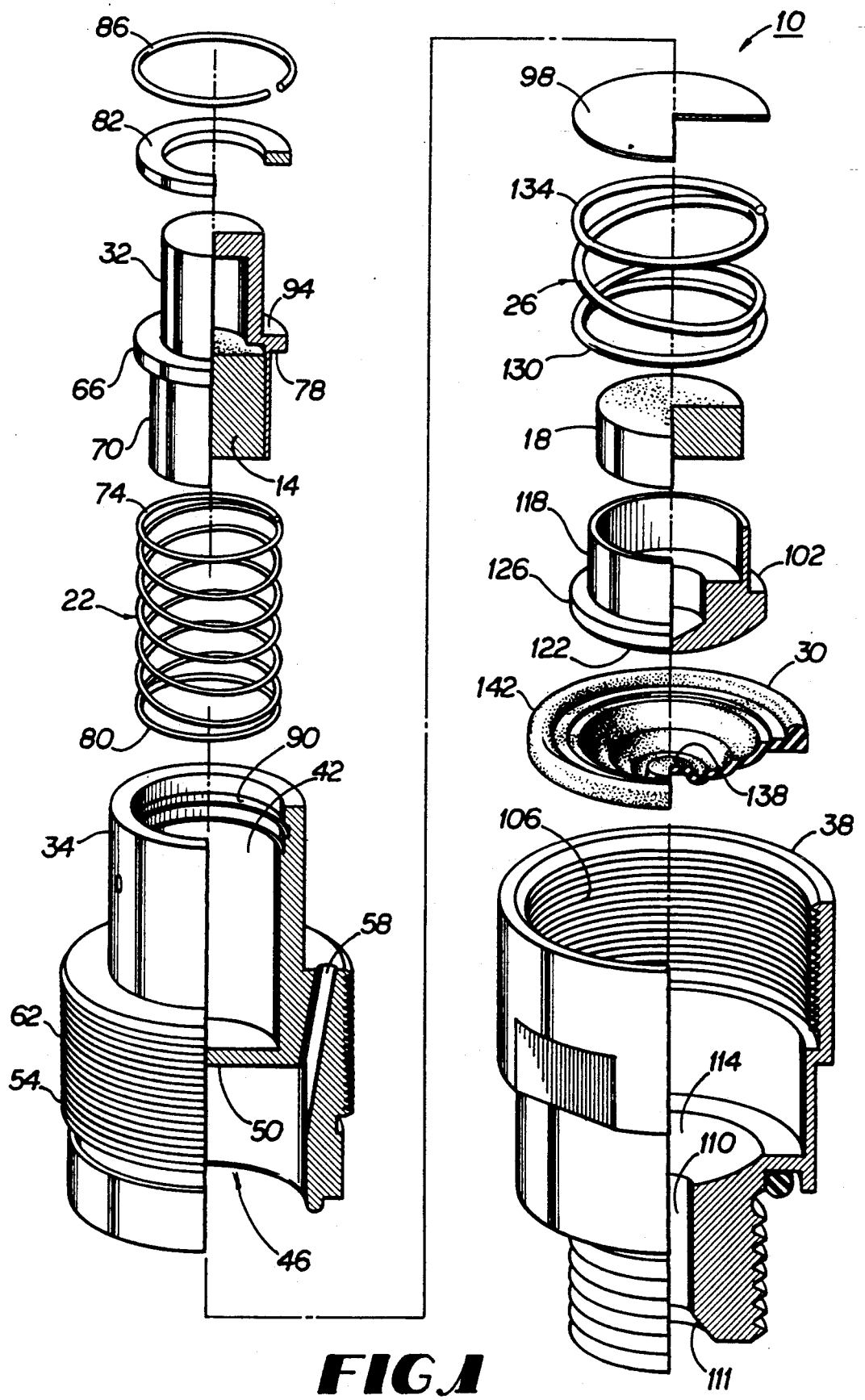
FIG. 1 is an exploded perspective, partially cut-away view of the pressure indicator of the present invention.
Figure 2:
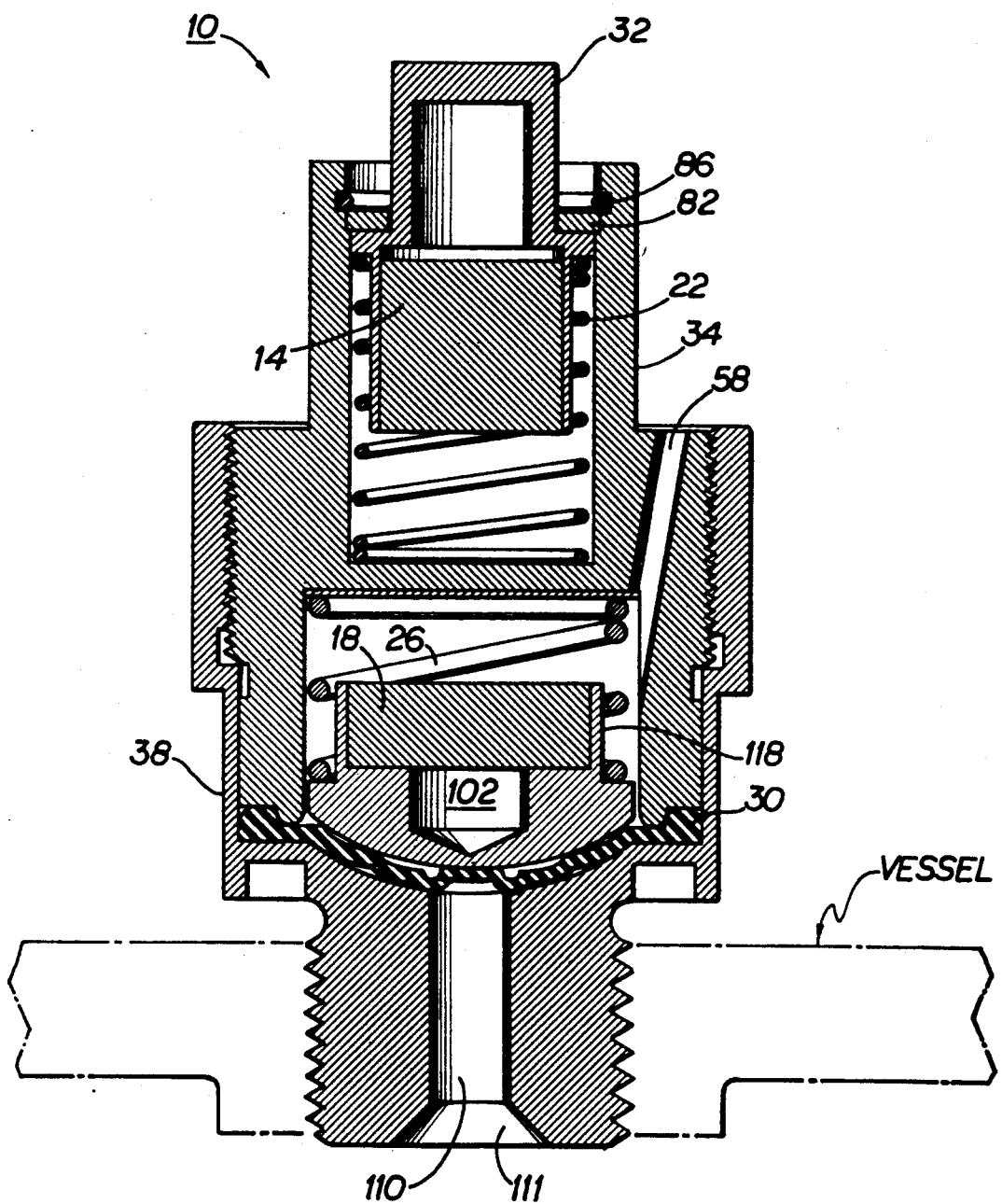
FIG. 2 is a cross-sectional view of the pressure indicator of FIG. 1.

FIGS. 1-2 illustrate pressure indicator 10 of the present invention. Shown as forming indicator 10 are magnetic elements 14 ($M_1$) and 18 ($M_2$), trip spring 22, calibration spring 26, and diaphragm 30. Also disclosed in FIGS. 1-2 are display 32 and the nominally upper and lower housings 34 and 38, respectively, of the indicator 10. Upper housing 34 defines cylindrical apertures 42 and 46 separated by wall 50, with magnetic element 14, trip spring 22, and display 32 nominally positioned within aperture 42. Upper housing 34 also includes an increased diameter midsection 54 threaded for attachment to lower housing 38 and a passage or bore 58 extending from the exterior 62 of midsection 54 through wall 50 into aperture 46. Bore 58 typically functions as a port for indicator 10. When providing indications based on differential pressure determinations, for example, bore 58 can be an input port for high pressurized fluid. When absolute pressure indications are necessary, bore 58 can be connected to a vacuum. Alternatively, if bore 58 is open to the ambient environment, the pressure at aperture 110 (referenced below) will be the gauge pressure.

Integrally formed with display 32 and separated from the display 32 by flange 66 is a metal holder 70 for magnetic element 14. The cylindrical shape and metallic nature of holder 70 permit it to be received by trip spring 22 so that the nominally uppermost portion 74 of trip spring 22 abuts the underside 78 of flange 66. The nominally lowermost portion 80 of the trip spring 22, conversely, abuts wall 50. Washer 82 and c-ring 86, which themselves are received by the interior locking grooves 90 of aperture 42, contact the upper side 94 of flange 66 as necessary to prevent display 32 and holder 70 from overtravel when in the extended (visible) position.

FIGS. 1-2 additionally show shim 98, which may be included as needed to ensure magnetic elements 14 and 18 maintain appropriate distances, and container 102 for housing magnetic element 18. Shim 98, calibration spring 26, magnetic element 18, container 102, and diaphragm 30 are positioned within aperture 106 of lower housing 38, with the aperture 106 threaded to engage the threaded midsection 54 of upper housing 34. Lower housing includes a reduced diameter bore, or aperture 110, and a truncated cone or funnel-shaped aperture 111 for receiving pressurized fluid and dampening pressure transients. Apertures 106 and 110 communicate at a cavity 114 within lower housing 38.

As illustrated in FIGS. 1-2, metal container 102 is integrally formed of a cylindrical portion 118 for receiving magnetic element 18 and a generally conical (or spherical) portion 122 that abuts diaphragm 30. Intermediate the cylindrical and conical portions 118 and 122, respectively, is a flange 126. The cylindrical portion 118 of container 102 is designed to receive and retain calibration spring 26, which in use has its nominally lowermost portion 130 abutting flange 126. The nominally uppermost portion 134 of calibration spring 26, by contrast, abuts either shim 98 (if present) or the surface of wall 50 opposite that adjacent trip spring 22.

Diaphragm 30, although generally a bottomed, truncated cone in shape as detailed in FIG. 1, includes a solid inverted nipple or similar internal protrusion 138 aligned in use with aperture 110. Diaphragm 30 also is designed to fit within cavity 114 and to receive the generally conical portion 122 of container 102, forming a pressure boundary that isolates fluid from the magnetic system as well. As noted earlier, making diaphragm 30 of a resilient elastomeric or similar material permits it to move much greater distances than, for example, many existing diaphragms when exposed to pressurized fluid. This greater movement capability of diaphragm 30 allows for much more precise control over the distance between magnetic elements 14 and 18, eliminating much of the "dead" band or zone in which no position change of magnetic element 18 occurs notwithstanding a pressure change and thereby increasing the resulting accuracy of indicator 10.

Resilient diaphragm 30, as positioned within cavity 114, also is capable of withstanding pressure transients of as much as 2500 psi or more in conjunction with the dampening effects provided by the existence and shape of aperture 111. Because the upper rim 142 of diaphragm 30 does not move relative to aperture 106, the friction necessarily associated with such movement is absent. Furthermore, when pressure is applied to indicator 10, diaphragm 30 rolls over the portion 122 of container 102 to a line-to-line, or surface-to-surface, fit with the portion 122 at the operating pressure point, minimizing the shear stress perpendicular to the thickness of diaphragm 30 and thus minimizing the tensile stress across the surface of the diaphragm 30.

Operation of an embodiment of indicator 10 in equilibrium at sea-level pressure of approximately 14.7 psi may be described as follows. At sea-level pressure, indicator 10 is designed so that the differential pressure across the effective area of diaphragm 30 is zero. In this condition trip spring 22 and calibration spring 26 exert opposite forces greater than the attractive forces of magnetic elements 14 and 18 (whose opposite poles are positioned adjacent wall 50 for attraction if both are magnets), with trip spring 22 forcing display 32 from within upper housing 34 to a visible position outside the upper housing 34.

As higher pressures appear across the effective area of the diaphragm 30, the diaphragm 30 responds by forcing its abutting magnetic element 18 within container 102 closer to the magnetic element 14. This response permits the attractive magnetic forces of elements 14 and 18 to overcome those of the opposed trip and calibration springs, 22 and 26, respectively, thereby retracting (in embodiments with automatic retraction) the visual display 32 to a position within the indicator 10. Should lower pressures return to the system, the visual display 32 will again reappear. Alternatively, embodiments of the present invention can be coupled to electromagnetic or other equipment and serve as a switch whose operation is governed by the pressure changes. If automatic retraction of visual display 32 is undesirable, indicator 10 can be designed so that, after sufficiently high pressures are encountered, the display 32 remains visible until reset manually or otherwise noted.

The design equation of equilibrium for embodiment of indicator 10 may be written as follows:

$$F_A = F_{M1} + F_{M2} - F_{TS} - F_{CS}$$

where $$F_A = P_{IN} \times A_{EFF} \quad\quad F_{TS} = K_{TS} \times D_{TS}$$

$$F_{M1} + F_{M2} = C \times B_g^2 \times A_g \quad F_{CS} = K_{CS} \times D_{CS}$$

and $P_{IN}$ = input pressure (psi)
$A_{EFF}$ = effective area of diaphragm (square inches)
C = magnetic constant
$B_g^2$ = magnetic flux (gauss)
$A_g$ = magnetic air gap area (square inches)
$K_{TS}$ = trip spring rate (pounds per inch)
$K_{CS}$ = calibration spring rate (pounds per inch)
$D_{TS}$ = trip spring compression (inches)
$D_{CS}$ = calibration spring compression (inches)

Nominal specifications for selected embodiments of indicator 10 include:

| | |
|---|---|
| operating pressure | 30-600 psi |
| indicating pressure | 5-40 psi (±0.5 psi) |
| limit pressure | 1400 psi |
| burst pressure | 2500 psi |
| operating temperature | −65 to 250° F. |
| vibration resistance | 20 g |
| shock resistance | 100 g (peak) |
| acceleration | 100 g |
| size | 1.61 × 0.85 inches |
| weight | 1.7 ounces |

The foregoing is provided for purposes of illustration, explanation, and description of embodiments of the present invention. Modifications and adaptations to these embodiments will be apparent to those of ordinary skill in the art and may be made without departing from the scope or spirit of the invention.

What is claimed is:

1. A pressure-sensitive device comprising:
   a. a housing comprising a wall;
   b. first and second assemblies, at least one of which is magnetic, positioned within the housing on opposite sides of the wall so as to exert forces tending to attract one to the other;
   c. a first resilient member positioned within the housing abutting a surface of the wall and attached to the first assembly, which first resilient member exerts a force opposed to the attractive force of the first and second assemblies;
   d. a second resilient member positioned within the housing abutting the surface of the wall opposite that abutted by the first resilient member and attached to the second assembly, which second resilient member exerts a force opposed to the attractive force of the first and second assemblies; and
   e. a resilient diaphragm positioned within the housing abutting the second assembly and adapted to oppose the force exerted by the second resilient member and cause the second assembly to move toward the first assembly as a function of the pressure sensed by the diaphragm.

2. A device according to claim 1 in which the housing further comprises a port adapted to receive pressurized fluid and shaped so as to dampen high pressure transients present at the port.

3. A device according to claim 2 in which the resilient diaphragm covers the port, for isolating the second assembly from the pressurized fluid.

4. A device according to claim 3 in which the port is generally funnel-shaped.

5. A device according to claim 4 in which the diaphragm is elastomeric, defines a surface, and is shaped to minimize tensile stress across its surface when the device is subjected to pressure.

6. A device according to claim 5 in which the diaphragm is shaped generally as a truncated cone.

7. A device according to claim 6 in which the first assembly comprises an indicator adapted to protrude from the housing as a function of the pressure sensed by the diaphragm.

8. A pressure-sensitive device comprising:
   a. a housing comprising a port adapted to receive pressurized fluid and shaped so as to dampen high pressure transients present at the port;
   b. first and second structures, at least one of which is magnetic, positioned within the housing so as to exert forces tending to attract one to the other;
   c. means, positioned within the housing, for exerting a force opposed to the attractive force of the first and second structures; and
   d. a resilient diaphragm positioned within the housing, defining a surface, and adapted to oppose the force exerted by the exerting means and cause the second structure to move toward the first structure as a function of the pressure sensed by the diaphragm.

9. A device according to claim 8 further comprising means for minimizing the tensile stress across the surface of the diaphragm.

10. An indicator for pressurized fluid flowing through a system comprising:
   a. a housing defining first and second apertures separated by a wall having opposed first and second surfaces, which second aperture has an interior diameter;
   b. a first structure comprising:
      i. a first spring within the first aperture and abutting the first surface of the wall;
      ii. a first magnetic element assembly within the first aperture and contacting the first spring; and
      iii. a display contacting the first magnetic element assembly and the first spring, a portion of which is adapted to extend beyond the first aperture to provide a visual indication dependent on the pressure of the fluid flowing through the system;

c. a resilient diaphragm, of diameter approximately the same as the interior diameter of the second aperture, fitted within the second aperture;

d. a second structure, within the second aperture intermediate the resilient diaphragm and the second surface of the wall, comprising:
  i. a second spring abutting the second surface of the wall; and
  ii. a second magnetic element assembly contacting the second spring and the resilient diaphragm; and in which the first and second magnetic element assemblies exert attractive forces opposite mechanical forces exerted by the first and second springs.

11. An indicator according to claim 10 further comprising a port isolated from the second aperture by the resilient diaphragm.

12. An indicator according to claim 11 in which the port is adapted to dampen high pressure transients present at the port.

13. An indicator according to claim 12 further comprising means for preventing the entirety of the display from extending beyond the first aperture.

14. A pressure-sensitive device comprising:
a. an upper housing (1) having an exterior, (2) defining first and second apertures, each aperture having an exterior and an interior, and a bore extending from the interior of the second aperture to the exterior of the upper housing, and (3) comprising a wall separating the interiors of the first and second apertures and having opposed upper and lower surfaces;
b. a coiled first spring positioned within the first aperture abutting the upper surface of the wall;
c. a first magnet positioned within the first aperture;
d. an assembly removably attached to the first spring comprising a holder for the first magnet, which holder is adapted to be surrounded by coils of the first spring and thereby adapted to move with the first spring;
e. a lower housing (1) defining third and fourth apertures, each aperture having an interior, and (2) a generally conical cavity separating the third and fourth apertures and truncated to permit fluid communication between the third and fourth apertures, which lower housing is adapted to engage the upper housing;
f. an elastomeric diaphragm adapted to be fitted into the generally conical cavity and preclude fluid communication between the third and fourth apertures;
g. a container positioned within the third aperture abutting the diaphragm and adapted to move with the diaphragm;
h. a second magnet positioned within the container so as to attract the first magnet; and
i. a coiled second spring positioned within the third aperture intermediate the diaphragm and the lower surface of the wall and removably attached to the container, which first and second springs oppose the attractive forces of the first and second magnets.

15. A device according to claim 14 in which the assembly further comprises a colored protrusion integrally formed with the holder for the first magnet, for providing visual indication of a selected pressure condition.

* * * * *